Dec. 12, 1950      T. M. NOLAN ET AL      2,533,609

PROCESS FOR MANUFACTURING MINUTELY ORIFICED ARTICLES

Filed March 19, 1949

INVENTORS
Terence M. Nolan and Stephan Gasper
BY
Bean, Brooks, Buckley & Bean.
ATTORNEYS Patented Dec. 12, 1950

2,533,609

UNITED STATES PATENT OFFICE 2,533,609

PROCESS FOR MANUFACTURING MINUTELY ORIFICED ARTICLES

Terence M. Nolan and Stephen Gasper, Buffalo, N. Y., assignors to Bell Aircraft Corporation, Wheatfield, N. Y.

Application March 19, 1949, Serial No. 82,373

5 Claims. (Cl. 18—47.5)

This invention relates to a process for manufacturing articles such as fine filters or metering orifices for fluids, or the like.

One of the objects of the invention is to produce an article of improved minutely orificed form.

Another object of the invention is to provide an improved process for manufacturing minutely orificed articles.

Another object of the invention is to produce a minutely orificed article of improved form whereby the openings therethrough are of uniformly accurate sectional dimension.

Another object of the invention is to provide an improved process for manufacturing finely orificed articles wherein the openings therethrough are of mechanically precise form and dimension while at the same time being too minute to be produced directly by mechanical means.

Another object of the invention is to produce a minutely orificed article of improved form as set forth hereinabove, by means of simple and inexpensive manufacturing processes.

Other objects and advantages of the invention will appear from the specification hereinafter.

The invention contemplates employment of materials which are characterized by possession of the quality sometimes referred to as "elastic memory"; that is, the ability to return to original shape when heated subsequent to having been previously heat-softened and deformed and then cooled while retained in deformed condition. For example, suitable materials for the purpose aforesaid are found in the class of thermo-plastic synthetic resins, such as methyl methacrylate; ethyl methacrylate; vinyl chloride; vinyl acetate, and interpolymers thereof. However, it is contemplated that any other suitable substances having such property may be used.

Figure 1:
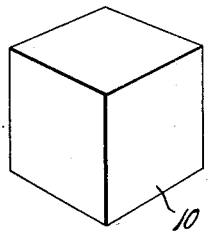
Fig. 1 is a perspective view of a typical stock piece from which an article of the invention may be produced.
Figure 2:
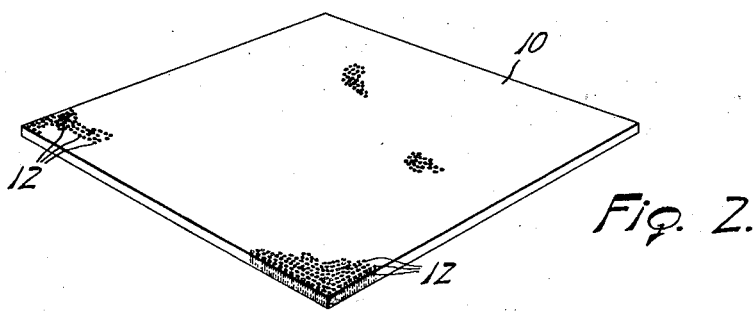
Fig. 2 is a perspective view of the same stock piece, illustrating the latter at an intermediate stage of the manufacturing operation.

Thus, in practicing the invention a piece of stock, for example, of fully or substantially polymerized thermoplastic resin material, will be first cut from a stock piece of sheet or bar form into approximately the desired overall shape of the article to be produced; for example as in the rectangular block form designated 10 in Fig. 1. The second step of the process of the invention involves heating the stock piece 10 to approximately 300° F. and then deforming it such as by any suitable rolling, pressing, ironing, or other stretching out process so as to provide the stock piece in relatively thin sheet form, as illustrated in Fig. 2. Then, while retaining the stock piece in the relatively thin sheet form as illustrated, it is permitted to cool to normal ambient temperature, whereupon it will retain its sheet form as illustrated in Fig. 2 until such time as it is subsequently reheated sufficiently to permit the "elastic memory" phenomenon to take place.

The third step of the process of the invention then involves mechanically drilling or punching the temporarily deformed stock sheet by suitable drill means or the like such as will provide one or more orifices 12 therethrough as may be required according to the use to which the article is to be put. For example, Fig. 2 illustrates the stock piece as being provided of overall foraminous form such as for use as a fluid filter or spray head or the like; but it will be understood that the piece 10 may be formed to include only one or a few such bores 12 in event it is to be used as a fluid flow meter or the like. The drill bits are selected so as to produce the bores 12 to be of such sectional dimension as will reduce to the desired sectional dimension thereof incidental to subsequent restoration of the stock piece to its original rectangular block form, as will be more fully explained hereinafter.

Figure 3:
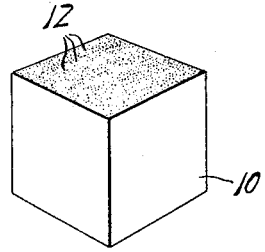
Fig. 3 is a perspective view of the same stock piece when fabricated in the final form of the article to be produced.

The fourth and final step of the process of the invention involves reheating of the bored stock piece of Fig. 2 to approximately 300° F. while removing all elastic deformation restraint therefrom, so that the stock piece returns to its initial block form as shown in Fig. 1. Thus, as illustrated by Fig. 3, the stock piece 10 is thus returned to identically its original size and shape as when it was first cut from the stock piece as shown in Fig. 1; but it will be noted however that incidental to return of the stock piece to original shape the orifices 12 are contracted in their sectional dimensions, and that the degree of such contraction is in direct proportion to the degree of contraction of the stock piece in directions normal to the axes of the orifices, which is in turn proportional to the degree of deformation first imposed upon the block of Fig. 1 to reduce it to the sheet form of Fig. 2.

Thus, for example, if the stock piece 10 is elastically deformed from the shape illustrated by Fig. 1 to the shape illustrated by Fig. 2 so as to be thereby reduced in thickness say for example to $\frac{1}{10}$ of its original thickness, and if the flattened stock piece is cooled and drilled as explained hereinabove and then subsequently reheated and permitted to return to its original size and shape, the orifices 12 therein will be reduced to $\frac{1}{10}$ diameters. Thus, it will be appreciated that by reason of the process of the invention the finished article as illustrated by Fig. 3 may include one or more orifices therethrough which are of diameters much smaller than could be simply drilled therein by presently available size drill bits. Also, it will be appreciated that multiplicities of such orifices may be thus provided in a stock piece of the character described in much more closely spaced relation than would be possible otherwise. This is because the stock piece when in the condition illustrated by Fig. 2 may be drilled for example by a gang of drill bits which are arranged in as closely spaced relation as is possible, and then during the final step of restoration of the stock piece to the form thereof shown in Fig. 3 the distances between adjacent orifices shrink in proportion to the degree of stock piece dimensional change as explained hereinabove.

Thus, it will be appreciated that by reason of the method of the invention an article may be formed to include one or more orifices therethrough which are mechanically precise and uniform in dimension even though they are of smaller sectional dimensions than could otherwise be produced by mechanical drill or punch means or the like; and that pluralities of such minute orifices may if desired be so provided in the finished article in much more closely spaced relation that would otherwise be possible. Hence, it will be appreciated that the finished article of Fig. 3 may comprise for example a "metering orifice" device such as is adapted to control rate of flow of "thin" fluids with improved accuracy and in otherwise improved manner, and that the number and sizes of the orifices will be dictated by the intended use. Or, the finished article of Fig. 3 may be employed for fluid filtering purposes, or as a spray head device such as is employed to disperse a fluid into the form of a fog or spray.

Of course, many other applications of the invention will be apparent, and therefore although only one form of the invention has been shown and described in detail it will be apparent to those skilled in the art that the invention is not so limited but that various changes may be made therein without departing from the spirit of the invention or the scope of the appended claims.

We claim:

1. The process of producing articles having minute orifices therethrough, which comprises first heat-softening a synthetic resin stock piece having the property of elastic memory and then deforming said stock piece by elongation in at least one direction, then cooling said stock piece while retaining the latter in deformed condition, then mechanically boring said stock piece in a direction substantially normal to said direction of elongation, and finally reheating said stock piece and allowing it to return toward its original shape to the desired degree so as to cause contraction of the bored portion thereof to the desired sectional dimensions thereof.

2. The process of producing a foraminous article of synthetic resin having the property of elastic memory, which comprises heat-softening a stock piece of such resin material and then deforming it by elongation in at least one direction, mechanically boring said stock piece in the direction of its dimensional reduction while in such deformed condition, and then reheating said stock piece to a temperature sufficient to cause the latter to reassume its original shape to the desired degree.

3. The process of producing articles having minute circular sectioned orifices therethrough, which comprises first heat-softening a synthetic resin stock piece having the property of elastic memory and then deforming said stock piece by elongation in two directions, then cooling said stock piece while retaining the latter in deformed condition, then drilling said stock piece in the direction of reduced dimension thereof, and finally reheating said stock piece and allowing it to return to its original shape so as to cause contraction of the bores thereof to the desired sectional dimensions thereof.

4. The process of producing a minutely foraminous article of synthetic resin having the property of elastic memory, which comprises heat-softening a stock piece of such resin material and then deforming it by dimensional reduction in one direction, mechanically boring said stock piece while in such deformed condition in the direction of dimensional reduction, and then reheating said stock piece to a temperature sufficient to cause the latter to reassume its original shape to the desired degree.

5. The process of producing an exactly sized minute opening in an article of material having the property of elastic memory, which comprises heat-softening a stock piece of such material and then deforming it in at least one direction, then providing a relatively large exactly sized opening in said stock piece while in such deformed condition, said opening extending in the direction of the dimensional reduction of said stock piece, and then reheating said stock piece to a temperature sufficient to cause the latter to return toward its original shape to the desired degree.

TERENCE M. NOLAN.
STEPHEN GASPER.

REFERENCES CITED

The following references are of record in the file of this patent:

UNITED STATES PATENTS

| Number | Name | Date |
|---|---|---|
| 2,027,962 | Currie | Jan. 14, 1936 |
| 2,055,002 | Chandler | Sept. 22, 1936 |
| 2,241,225 | Talbot | May 6, 1941 |
| 2,289,151 | Teague | July 7, 1942 |
| 2,368,085 | Barbieri | Jan. 30, 1945 |

FOREIGN PATENTS

| Number | Country | Date |
|---|---|---|
| 468,762 | Great Britain | July 12, 1937 |